(12) United States Patent
Abdul-Gaffoor et al.

(10) Patent No.: US 8,060,162 B2
(45) Date of Patent: Nov. 15, 2011

(54) SLIDER GROUNDING TO MITIGATE UNWANTED COUPLING AND LOSSY ANTENNA RESONANCE

(75) Inventors: Mohammed R. Abdul-Gaffoor, Palatine, IL (US); Minh H. Duong, Lake Bluff, IL (US); Louis J. Vannatta, Crystal Lake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1113 days.

(21) Appl. No.: 11/769,288

(22) Filed: Jun. 27, 2007

(65) Prior Publication Data
US 2009/0005134 A1  Jan. 1, 2009

(51) Int. Cl.
*H04M 1/00* (2006.01)
(52) U.S. Cl. ............... 455/575.4; 455/575.1; 455/575.3; 455/575.8; 455/575.5; 455/90.3
(58) Field of Classification Search .... 455/575.1–575.9; D14/138
See application file for complete search history.

(56) References Cited

U.S. PATENT DOCUMENTS

| | | | |
|---|---|---|---|
| 6,995,716 B2* | 2/2006 | Hwang et al. | 343/702 |
| 7,158,817 B2* | 1/2007 | Kubo | 455/575.3 |
| 7,245,950 B2* | 7/2007 | Iwai et al. | 455/575.7 |
| 7,452,223 B2* | 11/2008 | Ha et al. | 439/161 |
| 7,554,497 B2* | 6/2009 | Ohba et al. | 343/702 |
| 7,596,396 B2* | 9/2009 | Fagrenius et al. | 455/575.4 |
| 7,609,212 B2* | 10/2009 | Sato et al. | 343/702 |
| 7,733,278 B2* | 6/2010 | Kanasaki et al. | 343/702 |
| 2007/0021161 A1* | 1/2007 | Autti | 455/575.7 |
| 2007/0243913 A1* | 10/2007 | Collins | 455/575.4 |
| 2009/0029741 A1* | 1/2009 | Satou et al. | 455/566 |
| 2010/0016040 A1* | 1/2010 | Hiraoka et al. | 455/575.4 |

FOREIGN PATENT DOCUMENTS

GB   2414115 A   11/2005

OTHER PUBLICATIONS

Motorola; "Kyocera SE47 Slider Flex".
Motorola; "Samsung SGH-D500 Slider Flex".
Motorola; "Samsung SGH-E800 PCB Layout".
Motorola; "Sanyo V801sa".

* cited by examiner

*Primary Examiner* — Zhiyu Lu

(57) ABSTRACT

A method, apparatus, and electronic device with mitigated lossy antenna resonance are disclosed. A transceiver chassis may connect to a wireless network. A slider chassis may move relative to the transceiver chassis between an open position and a closed position. A first temporary grounding connection between the slider chassis and the transceiver chassis may connect in a closed position. A second temporary grounding connection between the slider chassis and the transceiver chassis of the slider phone may connect in the open position.

12 Claims, 5 Drawing Sheets

SLIDER GROUNDING TO MITIGATE UNWANTED COUPLING AND LOSSY ANTENNA RESONANCE

BACKGROUND OF THE INVENTION

1. Field of the Invention

The present invention relates to a method and device of a slider-design mobile telephone. The present invention further relates to mitigating unwanted coupling and lossy antenna resonance.

2. Introduction

Mobile telephone handsets may come in a wide variety of designs. The mobile telephone handset may be solid block design. The transceiver, display, and keypad may all be contained within the same housing.

The mobile telephone handset may be a flip-phone design. The transceiver and keypad may be contained in a transceiver chassis while the display may be contained in a display chassis. The display chassis may be attached at the bottom to a hinge at the top of the transceiver chassis. The display chassis may move away from the transceiver chassis.

The mobile telephone handset may be a rotating phone design. The transceiver and keypad may be contained in a transceiver chassis while the display may be contained in a rotational chassis. The rotational chassis may be attached at the bottom to a pivot at the top of the transceiver chassis. The rotating chassis may move rotationally while parallel to the transceiver chassis.

The mobile telephone handset may be a slider design. The transceiver and keypad may be contained in a transceiver chassis while the display may be contained in a slider chassis. The slider chassis may be attached to the transceiver chassis by a series of tracks, or some other mechanism that allows the slider chassis to move laterally along the transceiver chassis.

SUMMARY OF THE INVENTION

A method, apparatus, and electronic device with mitigated lossy resonance in the antenna are disclosed. A transceiver chassis may connect to a wireless network. A slider chassis may move relative to the transceiver chassis between an open position and a closed position. A first temporary grounding connection between the slider chassis and the transceiver chassis may connect in a closed position. A second temporary grounding connection between the slider chassis and the transceiver chassis of the slider phone may connect in the open position.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, a mobile telecommunications apparatus, and an electronic device, and other embodiments that relate to the basic concepts of the invention. The electronic device may be any manner of computer, mobile device, or wireless communication device.

A method, mobile telecommunications apparatus, and electronic device with mitigated lossy resonance in the antenna are disclosed. A transceiver chassis may connect to a wireless network. A slider chassis may move relative to the transceiver chassis between an open position and a closed position. A first temporary grounding connection between the slider chassis and the transceiver chassis may connect in a closed position. A second temporary grounding connection between the slider chassis and the transceiver chassis of the slider phone may connect in the open position.

Figure 1:
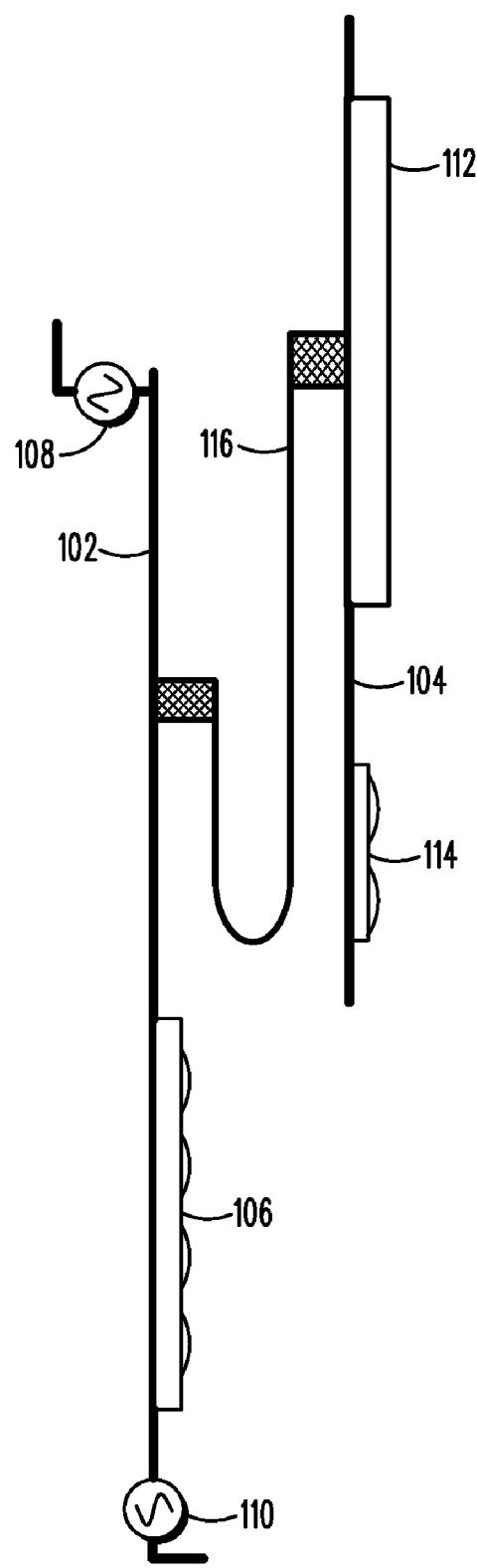
FIG. 1 illustrates in a block diagram one embodiment of a mobile telecommunications handset with a slider design.

FIG. 1 illustrates in a block diagram one embodiment of a mobile telecommunications handset 100 with a slider design. The mobile telecommunications handset 100 may have a transceiver chassis 102 and a slider chassis 104. The transceiver chassis 102 may have a numeric keypad 106 for entering information, such as telephone numbers, into the mobile telecommunications handset 100. The transceiver chassis 102 may have a first antenna element 108 and a second antenna element 110 for receiving and transmitting data communications. The first antenna element 108 and the second antenna element 110 may be a monopole, an inverted-F antenna (IFA), or a planar inverted-F antenna (PIFA). The slider chassis 104 may have a display 112 for showing data. The slider chassis 104 may have a navigation or music keypad 114 for selecting data content, such as music files and other media files.

A flexible printed circuit interconnection, or "flex", may connect the transceiver chassis 102 to the slider chassis 104. The flex 116 may enable transfer of electrical signals between the display, earpiece, navigation keypad, and other devices contained in the slider chassis 104 and the processor, main keypad, and other devices contained in the transceiver chassis 102. The flex 116 may have a length of about ~40 to ~100 mm. The flex 116 may act as a radiating or radio frequency structure due to the length floating between the transceiver chassis 102 and slider chassis 104. This radiation may create unwanted coupling of the harmonics of digital or high voltage analog signals, such as signals to the electroluminescent driver, into the radio frequency receiver through the antenna, thus leading to desense problems and other issues. Potentially, the floating flex 116, depending on flex length and spacing from the transceiver chassis 102 and the slider chassis 104, may also give rise to in band lossy resonance in the antenna, such as for the antenna element 108 in the low frequency or the 800 to 900 MHz band of operation of mobile phones.

Figure 2:
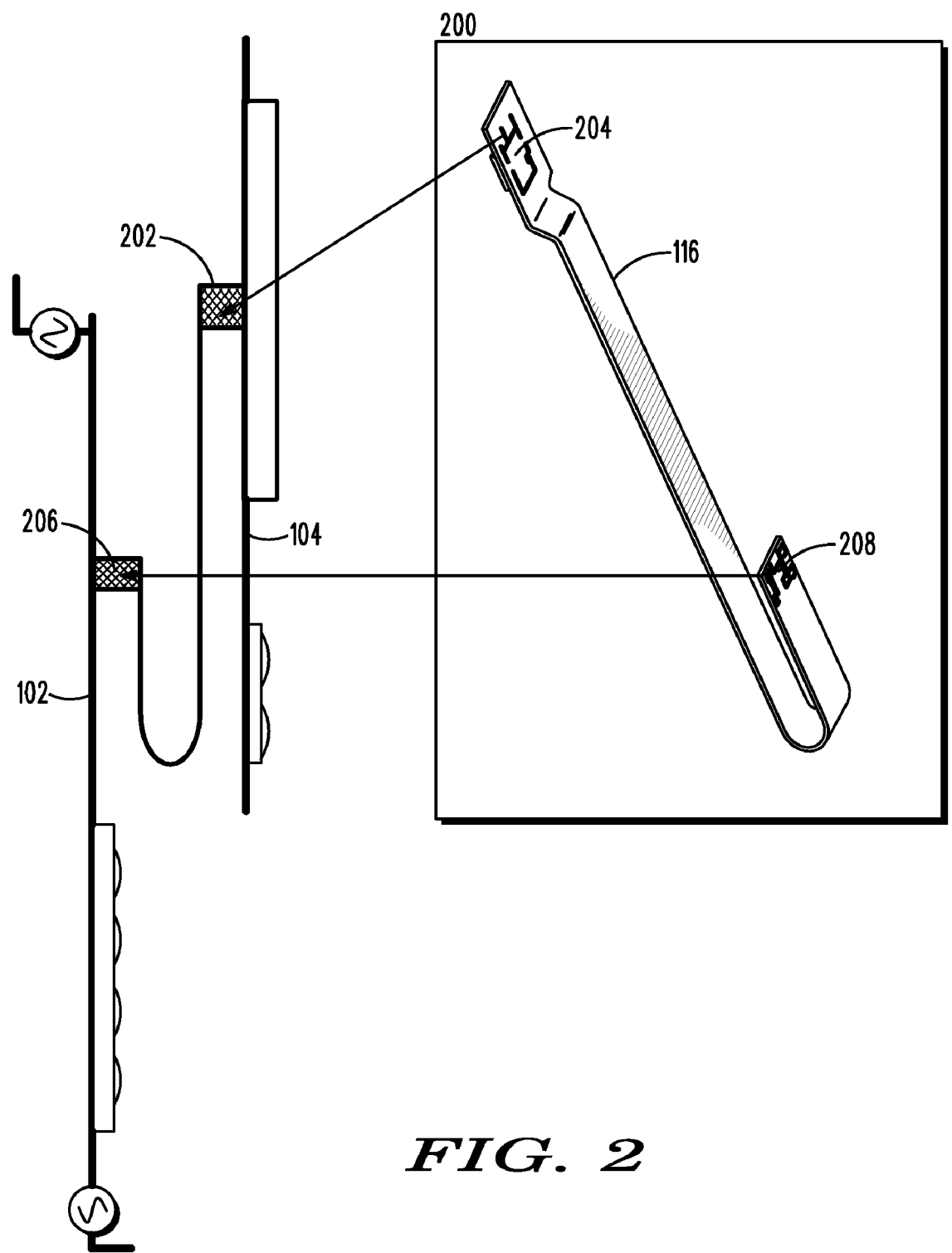
FIG. 2 illustrates in a block diagram with a three-dimensional inset the slider design.

FIG. 2 illustrates in a block diagram with a three-dimensional inset 200 of the slider design. The inset 200 illustrates a flex 116 in three dimensions. A slider grounding connector 202 may connect the slider chassis 104 to the slider static portion 204 of the flex 116. A transceiver grounding connector 206 may connect the transceiver chassis 102 to the transceiver static portion 208 of the flex 116. The length of the flex 116 connecting the slider to transceiver is significant at 900 MHz and 1900 MHz bands. The floating flex 116 may potentially result in lossy radiating resonance at 800 to 900 MHz band and also unwanted noise coupling into antenna at all bands of operation.

Figure 3:
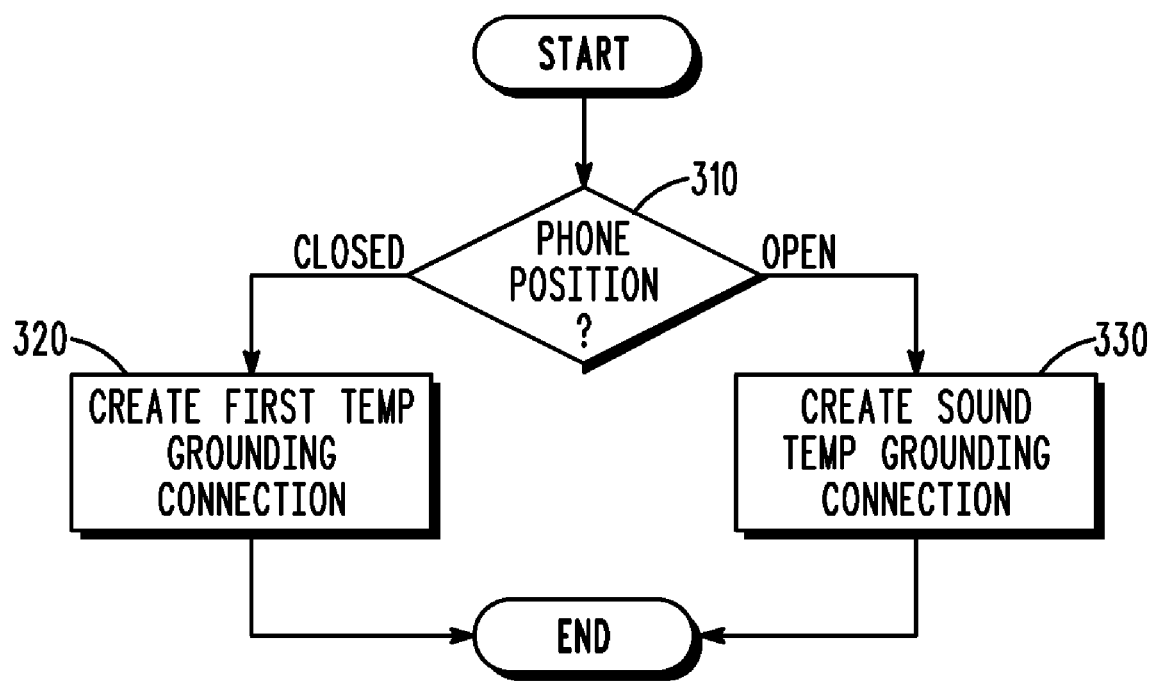
FIG. 3 illustrates in a flow chart a method for mitigating lossy antenna resonance in a slider phone.

FIG. 3 illustrates in a flow chart a method 300 for mitigating lossy antenna resonance in a slider phone. If the slider chassis 104 is in a closed position relative to the transceiver chassis 102 (Block 310), the transceiver chassis 102 may create a first temporary grounding connection with the slider chassis 104 (Block 320). If the slider chassis 104 is in an open position relative to the transceiver chassis 102 (Block 310), the transceiver chassis 102 may create a second temporary grounding connection with the slider chassis 104 (Block 330).

Figure 4A:
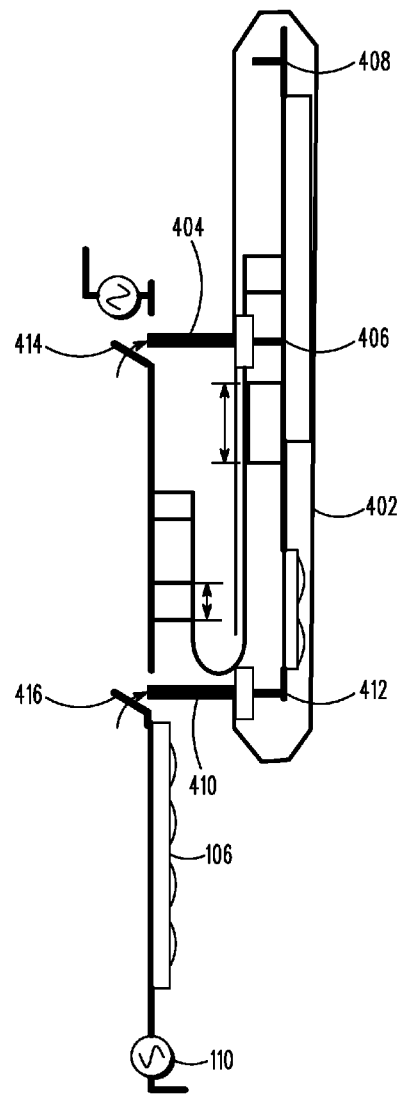
FIGS. 4a-b illustrate in block diagrams a mobile telecommunication handset with temporary grounding connections.
Figure 4B:
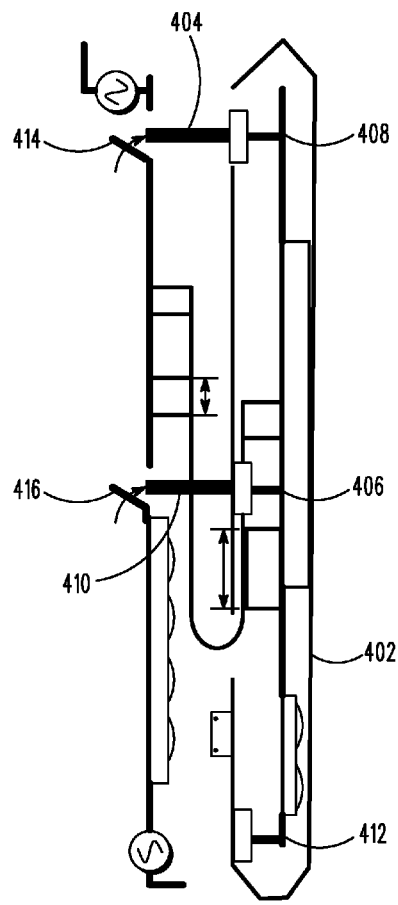

FIG. 4a illustrates in a block diagram a mobile telecommunication handset 400 in the open position with temporary grounding connections. FIG. 4b illustrates in a block diagram a mobile telecommunication handset 400 in the closed position with temporary grounding connections. The slider chassis 104 may be enclosed in a slider housing 402. When the slider chassis 104 is in an open position relative to the transceiver chassis 102, a first set grounding tabs may create a first temporary grounding connection with a first spring clip pair. When the slider chassis 104 is in a closed position relative to the transceiver chassis 102, a second set of grounding tabs may create a second temporary grounding connection with a second spring clip pair. A set of grounding tabs may act as both the first and second set of grounding tabs. Further, a spring clip pair may act as both the first and second spring clip pair. The location of the sets of grounding tabs along the length of the transceiver chassis 102 and the location of the spring clip pairs along the length of the slider chassis 104 may be chosen to optimize the performance of the antenna. The antenna optimization may factor in slider position, antenna element position, frequency of operation, and other considerations.

For example, a top set of grounding tabs 404 may be mounted anywhere on the top section of the transceiver chassis 102. A middle spring clip pair 406 may be attached to anywhere in the middle section of the slider chassis 104. When the slider chassis 104 is in an open position relative to the transceiver chassis 102, the top set of grounding tabs 404 may create a first temporary grounding connection with the middle spring clip pair 406. A top spring clip pair 408 may be attached to anywhere in the top section of the slider chassis 104. When the slider chassis 104 is in a closed position relative to the transceiver chassis 102, the top set of grounding tabs 404 mounted on the top of the transceiver chassis 102 may create a second temporary grounding connection with the top grounding clip 408.

In an alternate embodiment, a middle set of grounding tabs 410 may be mounted anywhere on the top section of the transceiver chassis 102. A bottom spring clip pair 412 may be attached to anywhere in the bottom section of the slider chassis 104. When the slider chassis 104 is in an open position relative to the transceiver chassis 102, the middle set of grounding tabs 410 may create a first temporary grounding connection with a bottom spring clip pair 412. When the slider chassis 104 is in a closed position relative to the transceiver chassis 102, the middle set of grounding tabs 410 may create a second temporary grounding connection with the middle grounding clip 406.

In a further embodiment, when the slider chassis 104 is in an open position relative to the transceiver chassis 102, the top set of grounding tabs 404 may create a first temporary grounding connection with the middle grounding clip 406. When the slider chassis 104 is in a closed position relative to the transceiver chassis 102, the middle set of grounding tabs 410 may create a second temporary grounding connection with the middle grounding clip 406.

In another embodiment, when the slider chassis 104 is in an open position relative to the transceiver chassis 102, the middle set of grounding tabs 410 may create a first temporary grounding connection with the bottom spring clip pair 412. When the slider chassis 104 is in a closed position relative to the transceiver chassis 102, the top set of grounding tabs 404 may create a second temporary grounding connection with the top spring clip pair 408.

In another embodiment, when the slider chassis 104 is in an open position relative to the transceiver chassis 102, the top set of grounding tabs 404 may create a first temporary grounding connection with the middle spring clip pair 406 and the middle set of grounding tabs 410 may create a second temporary grounding connection with the bottom spring clip pair 412. When the slider chassis 104 is in a closed position relative to the transceiver chassis 102, the top set of grounding tabs 404 may create a third temporary grounding connection with the top spring clip pair 408 and the middle set of grounding tabs 410 may create a second temporary grounding connection with the bottom spring clip pair 406.

The first and second temporary grounding connections may be active connections or passive connections. A series of electrical switches may be used to control the connection between the sets of grounding tabs and the transceiver chassis 102 or between the spring clip pairs and the slider chassis 104. For example, a first series of electrical switches 414 may connect the top set of grounding tabs 404 to the transceiver chassis 102, and a second series of electrical switches 416 may connect the middle set of grounding tabs 410 to the transceiver chassis 102. A software decision process may activate the series of electrical switches based on sensor data, transmission frequency, antenna position, slider position, and other factors.

Figure 5:
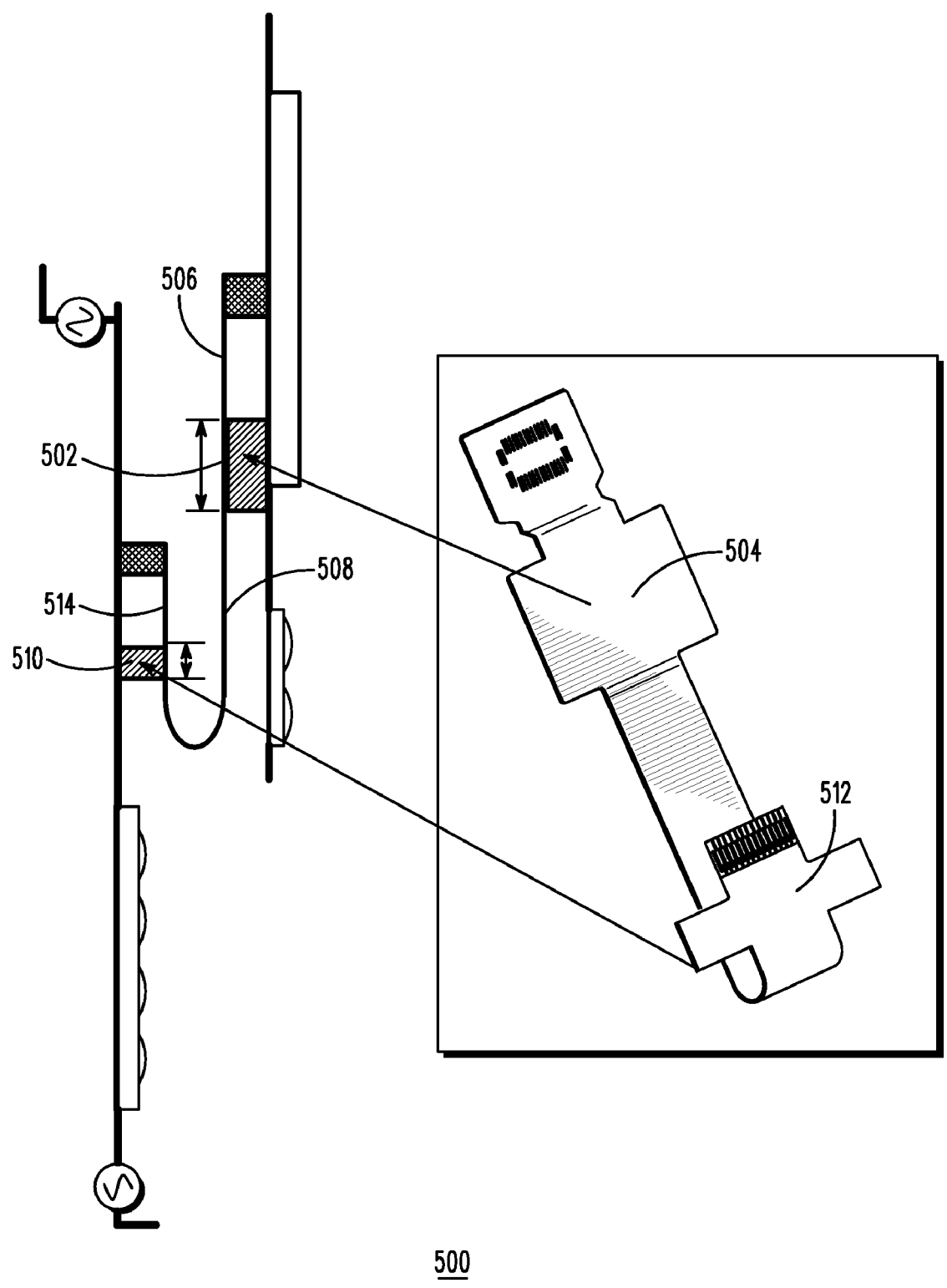
FIG. 5 illustrates in a block diagram a mobile telecommunications handset with a reduced effective length.

FIG. 5 illustrates in a block diagram a mobile telecommunications handset 500 with a reduced effective length. A slider set of intermediate grounding tabs 502 may connect the slider chassis 104 to an end 504 of a slider static portion 506 of the flex 116 proximate to a flexible portion 508 of the flex 116. A transceiver set of intermediate grounding tabs 510 may connect the transceiver chassis 102 to an end 512 of a transceiver static portion 514 of the flex 116 proximate to a flexible portion 508 of the flex 116. These intermediate grounding tabs may effectively shorten the length of the flex 116, so that any transmission bandwidth along the flex 116 occurs above the range of a communication bandwidth of the antennas. The effective shortening of the flex 116 moves the lossy resonance which occurs in the 900 MHz band to a higher frequency. The effective shortening also minimizes the noise coupling through the flex into the antenna/receiver circuitry. Alternately, the length of the flex 116 may be increased so that the transmission bandwidth occurs below the range of the communication bandwidth.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method of mitigating lossy resonance in an antenna of a slider phone, comprising:
   providing a first pair of temporary grounding connections created by a top spring clip pair on a slider chassis and a first set of grounding tabs on a transceiver chassis and additionally created by a middle spring clip pair on the slider chassis and the second set of grounding tabs on the transceiver chassis when the slider chassis is in an closed position relative to the transceiver chassis; and
   providing a second pair of temporary grounding connections created by a bottom spring clip pair on the slider chassis and a second set of grounding tabs on the transceiver chassis and additionally created by the middle spring clip pair and the first set of grounding tabs when the slider chassis is in a open position relative to the transceiver chassis.

2. The method of claim 1, further comprising:
   connecting the slider chassis and the transceiver chassis with a flex having a flexible portion, a slider static portion connecting the slider chassis to the flexible portion, and a transceiver static portion connecting the transceiver chassis to the flexible portion.

3. The method of claim 2, wherein the flex has an effective length such that a transmission bandwidth is outside a communication bandwidth of an antenna on the transceiver chassis.

4. The method of claim 3, further comprising:
   placing a slider set of intermediate grounding tabs on an end of the slider static portion of the flex proximate to the flexible portion; and
   placing a transceiver set of intermediate grounding tabs on an end of the transceiver static portion of the flex proximate to the flexible portion.

5. The method of claim 1, wherein the first pair of temporary grounding connections and the second pair of temporary ground connections are active connections.

6. A mobile telecommunications apparatus with mitigated lossy antenna resonance, comprising:
   a transceiver chassis that connects to a wireless network;
   a slider chassis that moves relative to the transceiver chassis between an open position and a closed position;
   a first pair of temporary grounding connections between the slider chassis and the transceiver chassis of the slider phone in the closed position;
   a second pair of temporary grounding connections between the slider chassis and the transceiver chassis in a open position;
   a top spring clip pair on the slider chassis;
   a first set of grounding tabs mounted on the transceiver chassis that creates one of the first pair of temporary grounding connections with the top spring clip pair;
   a bottom spring clip pair on the slider chassis; and
   a second set of grounding tabs mounted on the transceiver chassis that creates one of the second pair of temporary grounding connections with the bottom spring clip pair;
   a middle spring clip pair on the slider chassis;
   wherein the second set of grounding tabs creates the other one of the first pair of temporary grounding connections with the middle spring clip pair; and
   the first set of grounding tabs creates the other one of the pair of second temporary grounding connections with the middle spring clip pair.

7. The mobile telecommunications apparatus of claim 6, further comprising:
   a flex having a flexible portion, a slider static portion connecting the slider chassis to the flexible portion, and a transceiver static portion connecting the transceiver chassis to the flexible portion.

8. The mobile telecommunications apparatus of claim 7, wherein the flex has an effective length such that a transmission bandwidth is outside a communication bandwidth of an antenna on the transceiver chassis.

9. The mobile telecommunications apparatus of claim 8, further comprising:
   a first set of intermediate grounding tabs on an end of the slider static portion of the flex proximate to the flexible portion; and
   a second set of intermediate grounding tabs on an end of the transceiver static portion of the flex proximate to the flexible portion.

10. The mobile telecommunications apparatus of claim 6, wherein the first pair of temporary grounding connections and the second pair of temporary ground connections are active connections.

11. An electronic device with mitigated lossy antenna resonance, comprising:
    a transceiver chassis that connects to a wireless network;
    a slider chassis that moves relative to the transceiver chassis between an open position and a closed position;
    a top spring clip pair on the slider chassis;
    a bottom spring clip pair on the slider chassis;
    a middle spring clip pair on the slider chassis;
    a first pair of temporary grounding connections between the slider chassis and the transceiver chassis of the slider phone in the closed position, created by the top spring clip pair connecting a first set of grounding tabs on a transceiver chassis and by the middle spring clip pair connecting a second set of grounding tabs on the transceiver chassis;
    a second pair of temporary grounding connections between the slider chassis and the transceiver chassis in a open position, created by the bottom spring clip pair connecting the second set of grounding tabs and the middle spring clip pair connecting the first set of grounding tabs;
    a flex having a flexible portion, a slider static portion connecting the slider chassis to the flexible portion, and a transceiver static portion connecting the transceiver chassis to the flexible portion;

a first set of intermediate grounding tabs on an end of the slider static portion of the flex proximate to the flexible portion; and a second set of intermediate grounding tabs on an end of the transceiver static portion of the flex proximate to the flexible portion.

12. The electronic device of claim 11, wherein the first pair of temporary grounding connections and the second pair of temporary ground connections are active connections.

* * * * *